United States Patent
Ehnimb

(10) Patent No.: US 11,370,348 B2
(45) Date of Patent: Jun. 28, 2022

(54) METHOD FOR MONITORING TRANSPORTED GOODS

(71) Applicant: SPANSET INTER AG, Wollerau (CH)

(72) Inventor: David Ehnimb, Thalwil (CH)

(73) Assignee: SPANSET INTER AG, Wollerau (CH)

( * ) Notice: Subject to any disclaimer, the term of this patent is extended or adjusted under 35 U.S.C. 154(b) by 84 days.

(21) Appl. No.: 16/764,915

(22) PCT Filed: Nov. 15, 2018

(86) PCT No.: PCT/EP2018/000515
§ 371 (c)(1),
(2) Date: May 18, 2020

(87) PCT Pub. No.: WO2019/096438
PCT Pub. Date: May 23, 2019

(65) Prior Publication Data
US 2020/0290499 A1    Sep. 17, 2020

(30) Foreign Application Priority Data
Nov. 20, 2017    (DE) .................... 10 2017 010 707.6

(51) Int. Cl.
*B60P 7/08*    (2006.01)
*G07C 5/00*    (2006.01)
*G08B 5/36*    (2006.01)
*G08B 21/18*    (2006.01)

(52) U.S. Cl.
CPC ............ *B60P 7/0861* (2013.01); *G07C 5/008* (2013.01); *G08B 5/36* (2013.01); *G08B 21/182* (2013.01)

(58) Field of Classification Search
CPC ................. B60P 7/0861; G07C 5/008; G07C 2009/0092; G08B 5/36; G08B 21/182; G08B 13/1445; G08B 25/10; G06Q 10/0832
See application file for complete search history.

(56) References Cited

U.S. PATENT DOCUMENTS 7,112,023 B1 *    9/2006    Tardif .................. B60P 7/0861
                                                                340/440
7,972,099 B2 *    7/2011    Leggett ................ B60P 7/0861
                                                                410/103
(Continued)

FOREIGN PATENT DOCUMENTS

DE        102014012508 A1    2/2016
WO          2009113873 A1    9/2009

OTHER PUBLICATIONS

International Preliminary Report on Patentability dated May 26, 2020 in International Application No. PCT/EP2018/000515.
(Continued)

*Primary Examiner* — Hongmin Fan
(74) *Attorney, Agent, or Firm* — Patent Central LLC; Stephan A. Pendorf

(57) ABSTRACT

A method for securing cargo that can form a unit load when the cargo is immobilized on a load carrier or on a vehicle by means of a securing device, and a measuring device for measuring a tensile stress acting on the securing device being disposed on the securing device, the measuring device being equipped with a data processing system having a device for signal transfer to a central data processing system.

10 Claims, 1 Drawing Sheet

(56) References Cited

U.S. PATENT DOCUMENTS

| | | | |
|---|---|---|---|
| 8,506,220 B2* | 8/2013 | Morland | B60P 7/0861 |
| | | | 410/96 |
| 10,315,555 B2 | 6/2019 | Bruhn | |
| 10,328,840 B2* | 6/2019 | White | G01L 5/101 |
| 10,328,841 B2* | 6/2019 | Bika | G01L 5/047 |

OTHER PUBLICATIONS

International Search Report dated Jan. 16, 2019, in International Application No. PCT/EP2018/000515.

* cited by examiner

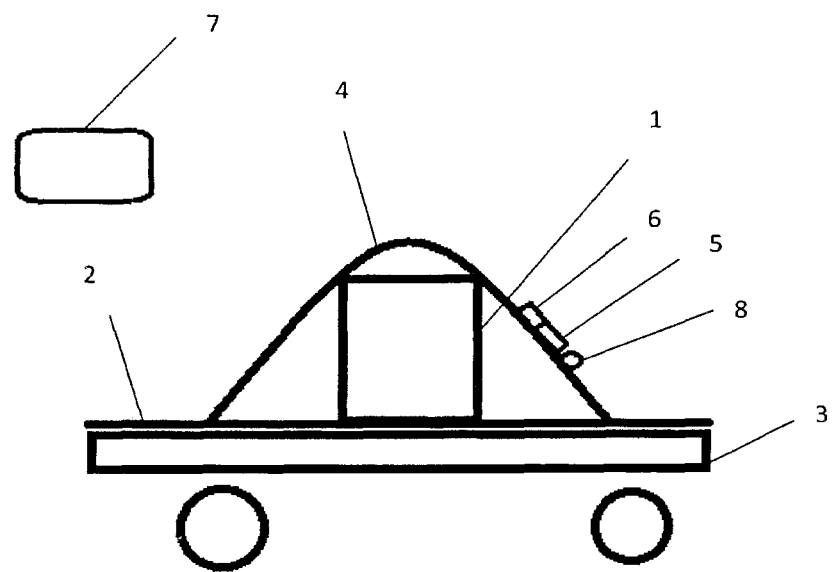

METHOD FOR MONITORING TRANSPORTED GOODS

The invention describes a method for securing cargo that can form a cargo unit while the cargo is immobilized on a load carrier or on a vehicle by means of a securing device, a measuring device for a tension of the securing device is disposed on the securing device, the measuring device contains a data processing system including a device for signal transfer to a central data processing system.

A device and a method for warning of theft and loss of transported goods are known from WO 2009/113 873 A1. The sensor disclosed therein registers changes, and the device can send an alarm when the cargo is not lashed, i.e. loose. The driver concerned can be warned. In addition, a message can be sent to a central office or to a central office of a transport company. Acoustic and optical signals for warning by means of signals are described, as well as the recording of videos. However, the method describes only the detection and information of a driver of a vehicle, for example, when the pre-tensioning force of a securing device, such as a lashing strap, decreases. This, however, has disadvantages, especially when a driver or a person is distracted or overlooks such a signal. The object of the invention consists in optimizing the method described above.

According to the invention, this object is achieved by the main Claim 1, while the subclaims set forth further embodiment variants of this approach according to the invention.

In the method of the invention for securing and/or determining the location of cargo, which can form a cargo unit, the cargo is immobilized on a load carrier, such as a pallet, or on a vehicle by means of at least one securing device, such as a lashing strap or the like, for example. The invention also encompasses the case where the cargo is made up of several cargo units and the method is applied separately to each cargo unit. Here, the cargo is the entire load, which—as aforesaid—may also consist of just one cargo unit. The cargo unit is made up of individual components of the cargo, which are to be secured. The method relates to a cargo unit. For the sake of clarity, the cargo forms just one cargo unit throughout the description. However, the invention is not limited in this regard.

Here, a known measuring device for a tension of the at least one securing device is disposed on the at least one securing device. The measuring device contains a data processing system including a device for signal transfer to a central data processing system, such as a black box in or outside a vehicle, for example, or another external data processing system or external data storage location, such as a cloud or a specific address at an external data storage location, wherein the data processing system is in wireless communication with the central data processing system, and wherein the at least one securing device is pre-registered in the central data processing system with the identification of the data processing system concerned, the Standard Tension Force and/or a visually detectable feature as parameter table 3.

S1: A desired value (value 1) of a pre-tensioning force per cargo item is established and stored in the central data processing system as parameter table 1, taking into account a friction coefficient of the load floor, the weight of the cargo and the applicable cargo securing standard.

S2: Furthermore, at least one desired value of a location data item and a position, specifically of at least one planned unloading point per cargo item, are established and stored in the central data processing system as parameter table 2.

S3: Then, per cargo item, based on value 1 in parameter table 1 associated with the cargo item and on the still available at least one securing device according to parameter table 3, a suggestion for the individual at least one securing device to be used for the cargo is calculated, and said suggestion is stored in data table X.

S4: Next, the cargo is secured by means of the at least one suggested securing device.

S5: Then, the pre-tensioning force (value A) of the at least one securing device used is detected by the individual measuring device in the central data processing system as data table A.

S6: This is followed by a check as to whether the sum of the values A per cargo item from data table A corresponds to value 1 of the same cargo item from parameter table 1. If the pre-tensioning force is not achieved, an information data item is generated, and the method is repeated starting from method step S3. If the pre-tensioning force is achieved, a data item confirming conformity to the applicable securing standard is sent to the central data processing system.

S7: Data table A is then updated with new values determined by the measuring device at controlled time intervals.

In a further embodiment it is provided that the central data processing system compares the sum of the values A per cargo item with value 1 of the same cargo item during transport, transport meaning the entire process of applying the securing device.

Based on a normal decrease in pre-tensioning force in the at least one securing device and taking into account a pre-programmable time safety margin, a data item, for example a signal, is sent to the central data processing system by the securing device when the at least one securing device concerned must be re-tensioned within a time safety margin. At the same time or alternatively, it can also be indicated which visually detectable feature from parameter table 3 identifies the at least one securing device concerned.

It can also be provided that a color indicator is used to visually signal to the user by "green" that he is on the way with no need for action regarding the state of immobilization of the cargo, for example during transport. There is no need to re-tension the cargo. "Yellow" means that the user should re-tension the cargo within the time safety margin. "Red" means that tension is in fact already below the relevant value 1 from parameter table 1. The cargo must be re-tensioned. Immobilization of the cargo does no longer conform to the applicable standard or is unlawful. A transport process must be interrupted immediately in order to immobilize the cargo again by means of the at least one securing device.

In a further embodiment it can also be provided that the central data processing system continuously stores the position of the cargo in the central data processing system as data table B. It is also possible that an itinerary to reach the unloading points contained in parameter table 2 is stored as data table C, which is done in the central data processing system. Furthermore, it can be provided that data table B is continuously compared with data table C. Here, one embodiment also provides that data from the data tables A and/or B and/or C is transferred to an external data storage location with a defined frequency, i.e. at regular intervals.

Furthermore it is provided that, when the pre-tensioning force of the at least one securing device of the cargo—which pre-tensioning force is stored in data table X—decreases in another place than specified in parameter table 2, a data item, such as an alarm, is sent to a pre-programmed address at the external data storage location. This enables unauthorized deviations from a transport route to be indicated, in order to initiate countermeasures. For example, authorities can be informed, or other known safeguarding measures can be taken.

Here, it can also be specifically provided that any deviation of the itinerary that is actually followed during transport of the cargo from a calculated itinerary without advance specific authorization is notified to a pre-programmed address at the external data storage location.

In a further embodiment of the invention it can also be provided that several securing devices are pre-registered in the central data processing system with an identification feature, such as a data item, a Standard Tension Force and/or a visually detectable feature, wherein the aforesaid three features constitute a parameter table 3.

In this case, the method of the invention includes the following steps:

S1: First, at least the desired value of the pre-tensioning force of the cargo is established and stored as value 1 in the central data processing system as parameter table 1, taking into consideration the friction coefficient of the load floor, the weight of the cargo and the applicable cargo securing standard.

S2: Then, an individual securing device for the cargo is selected by the central data processing system, taking into account the at least one desired value of the pre-tensioning force, value 1, from parameter table 1 associated with the cargo, taking into account the selectable securing devices according to parameter table 3. Then, the selected securing device is stored in the central data processing system.

S3: Then, the cargo is secured using the selected securing device, e.g. lashed.

S4: Next, the pre-tensioning force of the selected securing device achieved by securing the cargo is detected by the measuring device per cargo item as value 2, and said value 2 is transmitted to the central data processing system for storage as data table A.

S5: As a further step, value 2, i.e. the achieved pre-tensioning force, from data table A is then compared with value 1, i.e. the desired value of the pre-tensioning force of the cargo, from parameter table 1.

S6: If value 2 is the same as value 1, the measuring device outputs a confirmation data item to the central data processing system, confirming conformity to the applicable securing standard, or an alternative securing device is selected by the central data processing system. The method is then continued starting from method step S3, i.e. carried out again, until the confirmation data item is output, or, instead of the alternative securing device, a further securing device that is suited to provide the missing pre-tensioning force is suggested or selected by the central data processing system. This device is then additionally used by the person who is responsible for the cargo in order to secure the cargo.

In a further embodiment of the invention it is provided that data table A is updated with further values 2 determined by the measuring device at defined time intervals, which ensures that value 2 is regularly checked and stored as the actual value of the pre-tensioning force. This means, the measuring device determines value 2 at defined time intervals while the cargo is immobilized. Each value 2 is then transmitted to the central data processing system, which compares it with value 1, and, if value 2 decreases, the central data processing system—taking into account a predefined time safety margin—generates, stores and displays a data item indicating that the cargo must be secured again within the time safety margin. Alternatively or at the same time, the data item that has been generated can also be sent to an authorized entity so that said entity is activated and initiates safeguarding actions. An authorized entity for the purpose of the invention can for example be a monitoring device, a supervisor, a state agency, such as the police, or also a signaling device.

For example, it can also be provided that the measuring device starts outputting optical or acoustic signals, e.g. starts flashing, and/or an authorized entity, such as a supervisor, is informed that the cargo must be secured again, e.g. re-tensioned, within the time safety margin. This can for example be a vehicle driver who carries out transport of the cargo.

Furthermore, it can be provided that the state of the selected securing device is able to be determined after use, also after repeated use, based on the values 2 that have been determined. In this way, it can be determined whether the securing device works less efficiently and must therefore be inspected and maybe replaced.

It has already been mentioned that the measuring device determines value 2 per cargo item at defined time intervals while the cargo is immobilized, and each value 2 is transmitted to the central data processing system, which compares this value with value 1. Additionally, it can here be provided again that, with each value 2, a status of how the cargo is secured is able to be signaled by means of a variable optical indicator, such as a traffic light-type indicator or a color-variable light source, depending on said value 2. If the indicator is "green", there is no need for action. In case of "yellow", the securing device must be secured again, e.g. re-tensioned, within the predefined time safety margin. In case of "red", when tension has already fallen below value 1 from parameter table 1, this is no longer in conformity with the applicable securing standard or may be unlawful. This situation must be remedied immediately. For example, a vehicle driver must immediately interrupt transport in order to re-secure cargo to be transported.

Furthermore, it can be provided that the selected securing device, as well as its data processing system, determines a geographic position using known methods and systems, such as GPS, and at least one desired value of a location data item as a geographic position, such as at least one planned unloading point, or several location data items in the form of a planned itinerary, per cargo item is stored in the central data processing system as parameter table 2.

Then, the geographic position of the cargo is then stored by and in the central data processing system as data table B continuously or at defined time intervals while the cargo is immobilized.

As shown, it can also be provided that an itinerary to reach the unloading point contained in parameter table 2 is stored in the central data processing system as a desired value of the location data item. This is data table C. Data table B is then continuously compared with data table C while cargo is in the secured state. If data table B deviates from data table C, a data item is generated and sent to the central data processing system and/or to an authorized entity. Here, an optical or acoustic signal may be used, for example, an electronic message that is sent to the authorized entity, which can then take action against said deviation of the actual state from the desired state, i.e. the deviation of data table B from data table C. When the data item is sent to the central data processing system and/or the authorized entity, a defined safeguarding process can be initiated in the invention, which contributes to safeguarding the cargo and/or the vehicle that transports the cargo. For example, automatic devices of any kind can be activated, such as unmanned aerial vehicles, for example.

Furthermore, the same can be done when data table B deviates from data table C, in case of a deviating desired value as a location data item or of a plurality of these desired values as a deviating itinerary without authorization, such as without advance specific authorization, for example.

It can also be provided in the method that this is done if value 1 decreases at another desired value as a location data item than stored in parameter table 2, and a data item is generated and sent to the central data processing system and/or to the authorized entity.

Furthermore, it is generally provided in the method that, if the central data processing system is a black box, it transfers data from the data tables A and/or B and/or C to an external storage location at regular intervals, for example to a defined address at a virtual storage location, such as the cloud.

Here, it can also be provided that the state of the securing device that has been determined by analyzing the data is sent to a pre-programmed, i.e. a defined, further address in said cloud.

A load carrier for the purpose of the invention means any device that is able to support cargo in accordance with its intended use. A parameter table and a data table for the purpose of the invention mean any arrangement of data or measured values which is suited to carrying out the aforesaid method.

A data item for the purpose of the invention is any machine-readable and machine-processable digital representation of information which ensures that the method of the invention is carried out.

In addition, the previously known measurement of a pre-tensioning force of a securing device is optimized further by means of the method of the invention.

The invention will be explained in more detail below, using an exemplary embodiment and with reference to the figures. Further advantages, features and embodiments of the invention will be apparent from this explanation.

FIG. 1 shows a schematic view of cargo secured on a vehicle.

According to the exemplary embodiment, cargo 1 is to be immobilized on a vehicle 3 by means of one out of several selectable securing devices 4, 4'. A measuring device 5 for determining a tension of the securing device 4 is disposed on the securing devices 4 and 4' respectively. The measuring device 5 includes a data processing system 6 including a device for signal transfer to a central data processing system 7, such as a black box. The data processing system 6 is in wireless communication with the central data processing system 7.

The securing devices 4 and 4' respectively are pre-registered in the central data processing system 7 with an identification number, which is a vehicle registration number in the exemplary embodiment, a Standard Tension Force of the securing device and a visually detectable feature. These features constitute parameter table 3.

The friction coefficient of the load floor of the vehicle 3, a weight of the cargo 1 and a cargo securing standard are also known and are stored in the central data processing system 7 in the exemplary embodiment.

Relevant data can be input in the central data processing system manually, or the data is imported via interfaces. This includes all relevant data for carrying out the method, as well as an itinerary and/or a loading and an unloading point. All data determined during the method is also stored in the central data processing system, which is a black box in one case, or an external storage device, such as a central computer or a virtual computing unit, such as the cloud, in the exemplary embodiment. There, the data is sent to a specific address and stored there.

The desired value of the pre-tensioning force (value 1) of the cargo 1 is now calculated in the central data processing system as parameter 1, taking into consideration the friction coefficient of the load floor, the weight of the cargo and the cargo securing standard In the exemplary embodiment, the calculated value 1 is not the minimum pre-tension value, value 0, for the cargo unit required by the cargo securing standard. Rather, it is increased by a factor specified in the cargo securing standard. In the exemplary embodiment, it is 20 percent higher.

Based on the securing devices 4, 4' existing on the vehicle, such as lashing straps, the central data processing system 7 suggests a suitable securing device 4 for the cargo 1. The visual identification 8 of this selected securing device 4 is also indicated by the central data processing system.

A driver of the vehicle 3 chooses the selected securing device 4 based on the visual identification 8 and lashes the cargo 1 using the selected securing device 4. A driver for the purpose of the invention means any person who can operate the selected securing device 4 according to its intended use.

The measuring device 5 now detects the pre-tensioning force achieved by securing the cargo as value 2 and transmits this value 2 to the central data processing system for storage as data table A.

Now, value 2, i.e. the pre-tensioning force achieved, from data table A is compared with value 1 as the desired value of the pre-tensioning force of the cargo 1, from parameter table 1.

If value 2 is the same as value 1, a confirmation data item is output, which may consist of several data items or signals for the purpose of the invention, such as at least one data item to be stored in the central data processing system or the data processing system and/or an optical and/or acoustic signal.

Here, controlled by the data processing system or the central data processing system, the variable optical indicator, which is a traffic light-type indicator in the exemplary embodiment, is used to visually represent the relationship between the actually existing pre-tension, value 2, of the securing device 4 and value 1 and value 0. If value 2 is the same as or higher than value 1, a green color is shown. If value 2 is between value 1 and value 0, a yellow color is shown. If it is equal to or lower than value 0, a red color is shown. The indication is done by a known device, such as light-emitting diodes or a display, for example.

This indication takes place as long as the cargo remains secured, i.e. also during a transport process using a vehicle, vehicle meaning any kind of vehicle.

A red indication means that the minimum pre-tensioning force established by the applicable cargo securing standard is not achieved, value 0 is not reached. In this case, transport does not conform to the applicable cargo securing standard. Immediate intervention is required, either manually or automatically, in order to re-tension the selected securing device and to remedy this situation. A yellow indication means that it should be intervened manually or automatically within a defined time span, the default setting being 15 minutes, in order to re-establish the "green" state.

In the exemplary embodiment, value 1 is increased by a factor established in the cargo securing standard, such as 20 percent higher, as described before. However, in the exemplary embodiment it is also provided that value 1 can be independent thereof and defined dynamically. It is variable. This can for example be done based on a loss of pre-tension, value 2, of the securing device 4 occurred in a defined time interval, such as one hour, and/or other transport data that are usually variable, such as the number of vibrations caused by irregularities of a transport route, in order to warn a forwarder early enough that the value might fall to or even below the minimum desired value, value 0, which would be the "red" state.

A repeated decrease of the pre-tension of the securing device 4, i.e. of value 2, may result in that a higher safety margin, i.e. a higher value 1, is established.

Furthermore, it is provided that a predetermined itinerary of a transport route, i.e. several desired values of a location data item, is stored as data table C in the central data processing system. In the exemplary embodiment, this is done by an on-board system of the vehicle 3 or by providing data relating to the itinerary by other devices or data sources.

In the exemplary embodiment, the data processing system 6 of the selected securing device 4 determines a geographic position. The central data processing system 7 continuously stores the geographic position of the cargo as data table B.

Meanwhile, data table B is continuously compared with data table C. If data table B deviates from data table C, a data item is generated and sent as information to an authorized entity, and/or an alarm is triggered. This is also done when a deviation of the desired value as a location data item, i.e. a changed data table C, occurs without authorization.

A changed itinerary, i.e. a changed data table C, must be approved in advance by an authorized entity, such as a person, such as an operations coordinator, for example.

In the exemplary embodiment it is also provided that—depending on a change, such as a decrease, in pre-tension of the selected securing device 4, value 2, stored in data table A—the at least one desired value of the location data item, such as the unloading point or the itinerary, is able to be changed, taking into account the defined time interval. This is usually done by the central data processing system 7, or said system suggests a change of the unloading point or the itinerary. The intended result of this is that a new unloading point is determined as an intermediate destination or the itinerary is optimized, so that the pre-tension of the selected securing device 4 is prevented from falling to or below value 0 during the transport process.

Furthermore, it is provided in the exemplary embodiment that a data item is generated and sent to the central data processing system and/or to an authorized entity, and/or an alarm is triggered if value 1, i.e. the pre-tension of the selected securing device 4, is reduced or falls to 0 at another desired value as a location data item than stored in parameter table 2. In such a case, it must be assumed that the selected securing device 4 has not been loosened at the at least one desired value of the location data item, such as the intended unloading point. This means, that probably either an accident or theft of the cargo 1 has occurred.

In the exemplary embodiment it is also provided that the driver of the vehicle 3 may have a special authorization to select the securing device 4. This can be made use of if suggested by the central data processing system 7 when there are problems in achieving the pre-tension of the selected securing device 4, e.g. if it is impossible to achieve the desired value of the pre-tensioning force as value 1.

LIST OF REFERENCE NUMERALS

1. Cargo
2. Load carrier
3. Vehicle
4. Securing device
5. Measuring device
6. Data processing system
7. Central data processing system
8. Visual identification

The invention claimed is:

1. A method for securing cargo (1) that can form a cargo unit while the cargo (1) is immobilized on a load carrier (2) or on a vehicle (3) by means of a at least one securing device (4), wherein a measuring device (5) for a tension of the at least one securing device (4) is disposed on the at least one securing device (4), the measuring device (5) containing a data processing system (6) including a device for signal transfer to a central data processing system (7), wherein the data processing system (6) is in wireless communication with the central data processing system (7), wherein the at least one securing device (4) is pre-registered in the central data processing system (7) with an identification (8) of the data processing system concerned, the Standard Tension Force and/or a visually detectable feature as parameter table 3, comprising the following steps:

S1: establishing and storing a desired value (value 1) of a pre-tensioning force per cargo item (1) in the central data processing system (7) as parameter table 1, taking into account a friction coefficient of the load floor, a weight of the cargo (1) and an applicable cargo securing standard;

S2: establishing and storing at least one desired value of a location data item and a position, specifically of at least one planned unloading point per cargo item (1), in the central data processing system (7) as parameter table 2;

S3: calculating, per cargo item (1), based on value 1 in parameter table 1 associated with the cargo item (1) and on the still available at least one securing device (4) according to parameter table 3, a suggestion for an individual at least one securing device to be used for the cargo (1), and storing said suggestion in data table X;

S4: securing the cargo (1) by means of the at least one suggested securing device (4);

S5: detecting the pre-tensioning force (value A) of the at least one securing device used by the measuring device (5) in the central data processing system (7) as data table A;

S6: checking whether the sum of the values A per cargo item (1) from data table A corresponds to value 1 of the same cargo item (1) from parameter table 1, and if the pre-tensioning force is not achieved, generating an information data item and repeating starting from step S3, and if the pre-tensioning force is achieved, sending a data item confirming conformity to the applicable securing standard to the central data processing system (7); and S7: updating data table A with new values determined by the measuring device (5) at controlled time intervals.

2. The method for securing cargo (1) according to claim 1, wherein the central data processing system (7) compares the sum of the values A per cargo item (1) with value 1 of the same cargo item (1) during transport.

3. The method for securing cargo (1) according to claim 1, wherein, based on a normal decrease in pre-tensioning force in the at least one securing device (4) and taking into account a pre-programmable time safety margin, a data item is sent to the central data processing system (7) when the at least one securing device concerned must be re-tensioned within a time safety margin, and/or at the same time it is indicated which visually detectable feature from parameter table 3 identifies the at least one securing device concerned.

4. The method for seeming cargo (1) according to claim 1, wherein a color indicator is used to visually signal to a user by "green" that he is on the way with no need for action, by "yellow" that he should re-tension within the time safety margin, or by "red" that tension is in fact already below the applicable value 1 from parameter table 1.

5. The method for securing cargo (1) according to claim 1, Wherein the central data processing system (7) continuously stores the position of the cargo (1) in the central data processing system (7) as data table B.

6. The method for securing cargo (1) according to claim 1, wherein an itinerary to reach the unloading points contained in parameter table 2 is stored as data table C.

7. The method for securing cargo (I) according to claim 6, wherein the data table B is continuously compared with the data table C.

8. The method for securing cargo (1) according to claim 5, wherein data from at least one of the data tables A, B and C is transferred to an external data storage location with a defined frequency.

9. The method for securing cargo (1) according to claim 1, wherein, when the pre-tensioning force of the at least one securing device of the cargo (1)—which pre-tensioning force is stored in data table X—decreases in another place than specified in parameter table 2, a data item is sent to a pre-programmed address at the external data storage location.

10. The method for securing cargo (1) according to claim 5, wherein any deviation of the itinerary that is actually followed from a calculated itinerary without advance specific authorization is sent to a pre-programmed address at the external data storage location.

* * * * *